United States Patent
Henry et al.

(10) Patent No.: US 7,979,675 B2
(45) Date of Patent: Jul. 12, 2011

(54) PIPELINED MICROPROCESSOR WITH FAST NON-SELECTIVE CORRECT CONDITIONAL BRANCH INSTRUCTION RESOLUTION

(75) Inventors: G. Glenn Henry, Austin, TX (US); Terry Parks, Austin, TX (US); Brent Bean, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 277 days.

(21) Appl. No.: 12/481,035

(22) Filed: Jun. 9, 2009

(65) Prior Publication Data

US 2010/0205401 A1 Aug. 12, 2010

Related U.S. Application Data

(60) Provisional application No. 61/152,065, filed on Feb. 12, 2009.

(51) Int. Cl.
*G06F 9/38* (2006.01)
(52) U.S. Cl. ........................... 712/205; 712/234
(58) Field of Classification Search .......... 712/205–207, 712/233–243
See application file for complete search history.

(56) References Cited

U.S. PATENT DOCUMENTS

| | | | |
|---|---|---|---|
| 5,805,876 A | 9/1998 | Bose et al. | |
| 6,496,975 B1 * | 12/2002 | Slinger | 717/126 |
| 6,598,153 B1 * | 7/2003 | Flachs et al. | 712/234 |
| 6,757,816 B1 * | 6/2004 | Yoaz et al. | 712/239 |

* cited by examiner

*Primary Examiner* — William M Treat
(74) *Attorney, Agent, or Firm* — E. Alan Davis; James W. Huffman (57) ABSTRACT

A microprocessor includes a register that stores a state and a fetch unit that fetches instructions of a program. The program includes a first instruction followed non-immediately by a second instruction. The first instruction instructs the microprocessor to update the state in the register. The second instruction is a conditional branch instruction that specifies a branch condition based on the register state. The fetch unit dispatches the first instruction for execution but refrains from dispatching the second instruction for execution. Execution units receive the first instruction from the fetch unit and responsively update the register state. The fetch unit non-selectively correctly resolves the conditional branch instruction based on the register state when the execution units have updated the register state. The fetch unit also non-selectively refrains from sending the conditional branch instruction to the execution units to be resolved regardless of whether the execution units have updated the register state.

27 Claims, 4 Drawing Sheets

PIPELINED MICROPROCESSOR WITH FAST NON-SELECTIVE CORRECT CONDITIONAL BRANCH INSTRUCTION RESOLUTION

CROSS REFERENCE TO RELATED APPLICATIONS

This application claims priority to U.S. Provisional Application 61/152,065, filed Feb. 12, 2009, which is hereby incorporated by reference herein for all purposes.

This application is related to the following co-pending U.S. Patent Applications which are concurrently filed herewith, and which have a common assignee and common inventors, each of which is incorporated by reference herein for all purposes.

| Ser. No. | Title |
|---|---|
| 12/481,118 | PIPELINED MICROPROCESSOR WITH NORMAL AND FAST CONDITIONAL BRANCH INSTRUCTIONS |
| 12/481,427 | PIPELINED MICROPROCESSOR WITH FAST CONDITIONAL BRANCH INSTRUCTIONS BASED ON STATIC EXCEPTION STATE |
| 12/481,487 | PIPELINED MICROPROCESSOR WITH FAST CONDITIONAL BRANCH INSTRUCTIONS BASED ON STATIC MICROCODE-IMPLEMENTED INSTRUCTION STATE |
| 12/481,499 | PIPELINED MICROPROCESSOR WITH FAST CONDITIONAL BRANCH INSTRUCTIONS BASED ON STATIC SERIALIZING INSTRUCTION STATE |
| 12/481,511 | PIPELINED MICROPROCESSOR WITH FAST NON-SELECTIVE CORRECT CONDITIONAL BRANCH INSTRUCTION RESOLUTION |

FIELD OF THE INVENTION

The present invention relates in general to microprocessors, and more particularly to conditional branch instruction execution within a microprocessor.

BACKGROUND OF THE INVENTION

In the absence of control flow instructions, microprocessors fetch instructions sequentially and execute them. That is, the default action is for the microprocessor to fetch an instruction, and then to fetch the next sequential instruction, and then to fetch the next sequential instruction, and so forth. However, control flow instructions instruct the microprocessor to deviate from this sequential fetching regime. Microprocessors include in their instruction set architecture some form of conditional branch instruction that specifies a branch condition state (typically a condition flag or value in a general purpose register) and a branch condition (for example, bit set or bit clear or equal to zero or greater than a constant value). The conditional branch instruction also specifies a branch target address. The microprocessor examines the branch condition state in light of the branch condition to determine whether the branch condition state satisfies the branch condition specified by the conditional branch instruction. If the branch condition state satisfies the branch condition, the microprocessor begins fetching instructions at the branch target address rather than fetching the next sequential instruction.

As is well-known in the art of microprocessors, modern microprocessors include a pipeline of stages, each of which performs a different task with respect to program instructions. In a standard textbook model of a pipelined microprocessor, the stages include instruction fetch, instruction decode, operand fetch, execute, and result write-back stages. Conditional branch instructions within a program may significantly increase the amount of time required by the microprocessor to execute the program. This is because conventionally it is the execute stage that resolves the conditional branch instruction, i.e., that determines whether the branch condition state satisfies the branch condition. One reason for this is because there may be instructions in the program that are older in program order than the conditional branch instruction that update the branch condition state. Thus, the microprocessor must wait until the execution units produce the result of the older instructions, which are the source operands to the conditional branch instruction that constitute the branch condition state, before the operand fetch stage can fetch the source operands for the conditional branch instruction so that it can be issued for execution. However, the microprocessor may have fetched and processed in varying degrees many of the next sequential instructions after the conditional branch instruction and that are newer in program order than the conditional branch instruction by the time the execution units resolve the conditional branch instruction. This is particularly true in deeply pipelined and/or out-of-order execution microprocessors. If the execution units determine that the branch condition state satisfies the branch condition (i.e., the conditional branch instruction will be taken), the microprocessor must flush all the sequentially fetched instructions after the conditional branch instruction and commence fetching at the branch target address instead. This may significantly lengthen the time required by the microprocessor to execute the program.

To solve this problem, modern microprocessors include branch predictors that attempt to predict the direction (i.e., whether the branch condition state will satisfy the branch condition, referred to as "taken", or not satisfy it, referred to as "not taken"). However, the branch predictors may mispredict the direction, in which case the microprocessor incurs a branch misprediction penalty because it must flush the pipeline of the erroneously fetched instructions and commence fetching at the correct address (i.e., either the next sequential address or the branch target address, depending upon whether the correct direction is taken or not taken). Again, this may significantly lengthen program execution time, as discussed above, particularly in the presence of some conditional branch instructions within programs that may be difficult to predict with much accuracy. Consequently, an approach has been taken to attempt to correctly resolve conditional branch instructions early enough in the pipeline to override the branch predictors. Such an approach is described in U.S. Pat. No. 5,805,876 issued to Bose et al., entitled "METHOD AND SYSTEM FOR REDUCING AVERAGE BRANCH RESOLUTION TIME AND EFFECTIVE MISPREDICTION PENALTY IN A PROCESSOR". However, a disadvantage of the microprocessor described in Bose et al. is that it selectively resolves the conditional branch instructions early. That is, it only resolves conditional branch instructions early if they satisfy a specific set of requirements, such as being in the first dispatchable position within an instruction buffer when first detected.

Therefore, what is needed is a microprocessor with an improved technique for allowing programs to conditionally branch.

BRIEF SUMMARY OF INVENTION

In one aspect, the present invention provides a microprocessor. The microprocessor includes a register configured to store a state. The microprocessor also includes a fetch unit, coupled to the register, configured to fetch instructions of a program. The program includes a first instruction followed non-immediately by a second instruction. The first instruction instructs the microprocessor to update the state in the register. The second instruction is a conditional branch instruction that specifies a branch condition based on the state in the register. The fetch unit is configured to dispatch the first instruction for execution but to refrain from dispatching the second instruction for execution. The microprocessor also includes execution units, configured to receive the first instruction from the fetch unit and responsively update the state in the register. The fetch unit is configured to non-selectively correctly resolve the conditional branch instruction based on the state in the register when the execution units have updated the state in the register. The fetch unit is also configured to non-selectively refrain from sending the conditional branch instruction to the execution units to be resolved regardless of whether the execution units have updated the state in the register.

In another aspect, the present invention provides a method for performing fast conditional branch instructions in a microprocessor. The method includes fetching a first instruction of a program. The first instruction instructs the microprocessor to update a state in a register. The register is configured to store a state. The fetching of the first instruction is performed by a fetch unit of the microprocessor. The method also includes dispatching the first instruction from the fetch unit to execution units of the microprocessor. The method also includes updating the state in the register, in response to receiving the dispatched first instruction from the fetch unit. The updating is performed by the execution units. The method also includes fetching a second instruction of the program. The second instruction non-immediately follows the first instruction in the program. The second instruction is a conditional branch instruction that specifies a branch condition based on the state in the register. The fetching of the second instruction is performed by the fetch unit. The method also includes refraining from dispatching the second instruction for execution. The method also includes non-selectively correctly resolving the conditional branch instruction by the fetch unit based on the state in the register when the execution units have updated the state in the register. The method also includes non-selectively refraining from sending the conditional branch instruction to the execution units to be resolved regardless of whether the execution units have updated the state in the register.

In another aspect, the present invention provides a computer program product for use with a computing device, the computer program product includes a computer usable storage medium, having computer readable program code embodied in the medium, for specifying a microprocessor configured to perform fast conditional branches. The computer readable program code includes first program code for specifying a register configured to store a state. The computer readable program code also includes second program code for specifying a fetch unit, coupled to the register, configured to fetch instructions of a program. The program includes a first instruction followed non-immediately by a second instruction. The first instruction instructs the microprocessor to update the state in the register. The second instruction is a conditional branch instruction that specifies a branch condition based on the state in the register. The fetch unit is configured to dispatch the first instruction for execution but to refrain from dispatching the second instruction for execution. The computer readable program code also includes third program code for specifying execution units, configured to receive the first instruction from the fetch unit and respon-sively update the state in the register. The fetch unit is configured to non-selectively correctly resolve the conditional branch instruction based on the state in the register when the execution units have updated the state in the register, and configured to non-selectively refrain from sending the conditional branch instruction to the execution units to be resolved regardless of whether the execution units have updated the state in the register.

An advantage of the present invention is that because the fetch unit (which may be the microcode unit) resolves and retires fast conditional branch (FCB) instructions without dispatching them to the execution pipeline, the FCB instructions are potentially executed faster than conventional conditional branch instructions. Furthermore, the correct execution of FCB instructions by the fetch unit eliminates mispredictions and corrections that are associated with conventional conditional branch instructions in situations where a FCB instruction may be used by the programmer rather than a conventional conditional branch instruction. Another advantage is that fewer resources of the microprocessor are used to resolve and retire the FCB than a conventional conditional branch instruction. For example, because the FCB is not dispatched to the execution pipeline, the FCB does not occupy entries in the RAT, reservation stations, execution units, or reorder buffer.

DETAILED DESCRIPTION OF THE INVENTION

A drawback of conventional approaches to the problems described above is that they rely on the microprocessor to determine the circumstances in which it may resolve a conditional branch instruction early in the pipeline, and if the circumstances do not exist, the microprocessor must resort to predicting the conditional branch instruction and then incurring the penalty associated with correcting (i.e., flushing, fetching from correct address, and executing) if the prediction was incorrect. The present inventors have observed that there are times when the programmer writing a program (or compiler/translator compiling/translating a higher-level language program into a machine language program) knows or can control the circumstances surrounding the update of a branch condition state that will be used by a conditional branch instruction in the program. The inventors have taken advantage of this observation to include within a microprocessor's instruction set a special type of conditional branch instruction, referred to herein as a fast conditional branch (FCB), that a programmer may include in his program that instructs the microprocessor to non-selectively correctly resolve the FCB within its fetch unit early in the pipeline, rather than sending the FCB to the execution units to be resolved and rather than making a prediction about the FCB. In response to detecting the FCB, the fetch unit non-selectively correctly resolves the FCB. That is, rather than predicting the FCB and then sending it to the execution units to be resolved in some circumstances, the fetch unit always correctly resolves the FCB. This requires the fetch unit to wait until the branch condition state has been updated by the newest state-updating instruction that is older in program order than the FCB, if any, and then using the updated state to resolve the conditional branch instruction. However, the presence of the FCB in the instruction set of the microprocessor enables the programmer to schedule the state-updating instruction sufficiently ahead of the FCB such that there is a high likelihood that by the time the fetch unit encounters the FCB the fetch unit can immediately resolve the FCB. This may be significantly advantageous because it avoids the possibility of a branch misprediction and the concomitant penalty associated therewith within a pipelined microprocessor. The misprediction avoidance advantage of the FCB may be even greater in the absence of branch prediction, such as in a low-cost and/or low-power microprocessor or microcontroller, or in the microsequencer of a microcode unit within a microprocessor, such as according to one embodiment of the present invention described herein.

The FCB is preceded in the program by a state-updating instruction that updates the branch condition state specified by the FCB. Although the fetch unit waits to resolve the FCB until the execution units have updated the branch condition state, the FCB gives the programmer the ability to schedule the state-updating instruction in advance of the FCB such that there is a high likelihood that by the time the fetch unit encounters the FCB the execution units have already updated the state and the fetch unit can immediately correctly resolve the FCB. In one embodiment, the programmer includes in the program between the state-updating instruction and the FCB an explicit wait instruction that performs the wait function; in another embodiment, the fetch unit performs the wait function implicitly upon encountering the FCB.

Figure 1:
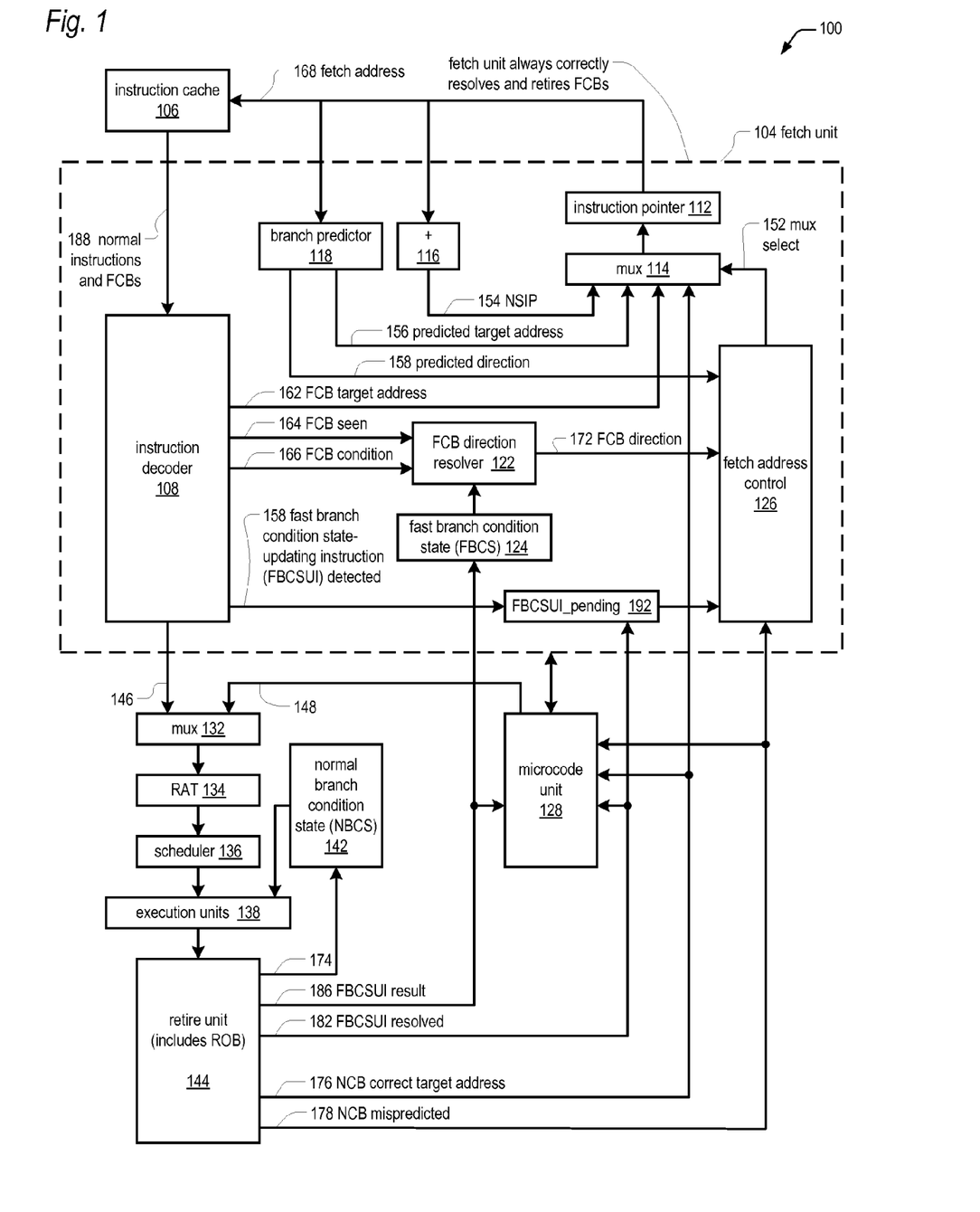
FIG. 1 is a block diagram illustrating a microprocessor according to the present invention.

Referring now to FIG. 1, a block diagram illustrating a microprocessor 100 according to the present invention is shown.

In one embodiment, the microprocessor 100 stores user programs in an external memory, which is not shown. User programs include operating systems, application programs, system BIOS, or any other type of program written in or translated or compiled into the native instruction set of the microprocessor. The instruction cache 106 fetches user program instructions from the external memory. The instruction cache 106 provides temporary storage for the most frequently fetched instructions. In one embodiment, the instruction cache 106 is within microprocessor 100. In other embodiments, the instruction cache 106 is external to microprocessor 100.

A fetch unit 104 of the microprocessor 100 fetches instructions from the instruction cache 106. The fetch unit 104 includes an instruction decoder 108, which determines the type of instruction that was fetched. Instructions fetched from the instruction cache 106 include fast conditional branch instructions (FCB instructions) and normal instructions including normal conditional branch instructions (NCB instructions) and fast branch condition state-updating instructions (FBCSUI). Normal instructions are executed by execution units of the microprocessor 100. A microprocessor 100 correctly resolves a conditional branch instruction that is either an NCB or FCB instruction when it determines the correct direction and correct target address of the conditional branch instruction. This is distinct from a microprocessor 100 making a prediction about a conditional branch instruction, since the microprocessor 100 may eventually determine that the prediction was incorrect and have to correct itself. A FBCSUI updates the FBCS 124, which is described below.

FCB instructions are correctly resolved and retired within the fetch unit 104 of the microprocessor 100. Execution units 138 of microprocessor 100 execute normal instructions, including NCB instructions and FBCSUI. A retire unit 144 of microprocessor 100 retires normal instructions, including NCB instructions and FBCSUI. Conditional branch instructions specify a branch condition and a branch target address. The processor examines a stored branch condition state to determine whether it satisfies a condition specified by the conditional branch instruction, i.e., to determine the direction of the conditional branch instruction. If the branch condition state satisfies the branch condition, then the branch direction is "taken;" otherwise the direction is "not taken." If the branch is taken, then the branch target address specifies the address of the next instruction to execute. If the branch is not taken, then the next instruction to execute is the next sequential instruction after the NCB or FCB instruction. The processing of FCBs, NCBs, and FBCSUIs is described in more detail in the following paragraphs.

In one embodiment, the instruction decoder 108 includes an instruction translator that translates macroinstructions of a macroinstruction set of the microprocessor 100 (such as the x86 instruction set architecture) into microinstructions of a microinstruction set architecture of the microprocessor 100. The instruction translator may translate macroinstructions into an FCB, NCB, FBCSUI, or other instruction described herein.

The instruction decoder 108 determines if a fetched instruction is an FCB, NCB, FBCSUI, or other instruction. If the decoded instruction is an NCB or other normal instruction, the instruction decoder 108 transfers the normal instruction 146 to mux 132. If the decoded instruction is an FCB, the instruction decoder 108 generates a true value on an FCB seen indication 164 to an FCB direction resolver 122 in the fetch unit 104. Additionally, the instruction decoder 108 transfers an FCB condition 166 specified by the FCB instruction to the FCB direction resolver 122. Examples of the FCB condition 166 are bit on, bit off, equal to, less than, greater than, and in which the bit or field of the FBCS 124 to be evaluated is also specified in the FCB condition 166, as one skilled in the art will appreciate. The instruction decoder 108 also transfers an FCB target address 162 specified by the FCB instruction to a mux 114 in the fetch unit 104.

The FCB direction resolver 122 resolves the direction of FCB instructions in the fetch unit 104. The FCB direction resolver 122 generates a FCB direction 172 to a fetch address control 126, in response to the FCB seen indication 164, the FCB condition 166, and a fast conditional branch state (FBCS) 124. If the FBCS 124 satisfies the FCB condition 166, then the FCB direction 172 is true; otherwise, the FCB direction 172 is false. The fetch unit 104 always correctly resolves and retires FCB instructions. The fetch unit 104 does not dispatch FCB instructions to the execution units 138 and retire unit 144 because the fetch unit 104 itself executes and retires all FCB instructions.

If the decoded instruction is a FBCSUI, the instruction decoder 108 generates a true value on a FBCSUI detected indicator 158 that sets a FBCSUI_pending flag 192. The microprocessor initializes the FBCSUI_pending flag 192 to a cleared state. Furthermore, when the retire unit 144 retires a FBCSUI by updating the FBCS 124 with a FBCSUI result 186, it generates a true value on a FBCSUI resolved indicator 182 that clears the FBCSUI_pending flag 192. Additionally, if the microprocessor 100 flushes a FBCSUI (due to a mispredicted NCB, for example), the microprocessor 100 clears the FBCSUI_pending flag 192. The FBCSUI_pending flag 192 is provided to the fetch address control 126, which uses the FBCSUI_pending flag 192 to determine whether to stop fetching instructions 188 from the instruction cache 106, as discussed below. The FBCSUI result 186 and FBCSUI resolved indicator 182 are also provided to the microcode unit 128.

By using an FCB rather than an NCB, the programmer is giving a hint to the microprocessor 100 that the FBCS 124—or at least the portion of the FBCS 124 specified as the branch condition state by the FCB—will be updated soon, if not already, by an FBCSUI that is older in program order than the FCB. The FBCS 124 updated by the FBCSUI may be one of many different branch condition states within the microprocessor 100. For example, the FBCSUI may move state from other portions of the microprocessor 100 to the FBCS 124, such as architectural state like the condition code register (for example, the x86 EFLAGS register) or general purpose registers. Furthermore, although the embodiment of FIG. 1 shows the FBCS 124 residing within the fetch unit 104, other embodiments are contemplated in which the FBCS 124 comprises architectural state of the processor such as the condition code register or general purpose registers.

The fetch unit 104 also includes a branch predictor 118. The branch predictor 118 generates a predicted target address 156 to the fetch unit mux 114 and a predicted direction 158 to the fetch address control 126 in response to the instruction pointer 112 of the fetch unit 104 generating a fetch address 168 to the instruction cache 106. In particular, the branch predictor 118 indicates to the fetch address control 126 that the predicted target address 156 and predicted direction 158 are valid if the fetch address 168 specifies a cache line that previously included a conditional branch instruction. In one embodiment, as discussed below, the fetch unit 104 inhibits branch prediction for an FCB instruction.

The fetch address control 126 of the fetch unit 104 generates a mux select 152 to the fetch unit mux 114 to select the fetch address 168 that is used to fetch the next instruction from the instruction cache 106. In response to a true NCB mispredicted indication 178, the fetch address control 126 generates the mux select 152 to select the NCB correct target address 176. Otherwise, in response to a FCB direction 172 indicating a FCB is taken, the fetch address control 126 generates the mux select 152 to select the FCB target address 162. Otherwise, in response to a predicted direction 158 indicating a NCB is taken, the fetch address control 126 generates the mux select 152 to select the predicted target address 156. Otherwise, the fetch address control 126 generates the mux select 152 to select the next sequential IP address (NSIP) 154. The NSIP is simply the next sequential address in the instruction cache 106 following the fetch address 168. An address increment circuit 116 generates the NSIP 154 each time the instruction pointer 112 generates a fetch address 168.

In one embodiment, the branch predictor 118 includes a branch target cache (not shown). When the fetch address 168 hits in the branch target cache, the branch predictor 118 generates the predicted target address 156 and predicted direction 158 to the fetch address control 126. The microprocessor 100 updates the branch target cache with the addresses and resolved target addresses of previously executed conditional branch instructions. Furthermore, the microprocessor 100 updates the branch target cache with direction prediction information based on the resolved direction of the previously executed conditional branch instructions. In one embodiment, the microprocessor 100 does not update the branch target cache based on executed FCB instructions since the fetch unit 104 correctly resolves and retires FCB instructions. By always correctly resolving the FCB in the fetch unit 104, the microprocessor advantageously avoids incurring a branch misprediction penalty related to the processing of FCBs; whereas, the microprocessor may incur a branch misprediction penalty related to the processing of NCBs as discussed below.

The instruction pointer register 112 receives and stores the address selected by mux 114 of the fetch unit 104. The instruction pointer register 112 provides the fetch address 168 to the instruction cache 106 to fetch a cache line from the instruction cache 106.

The mux 132 outside the fetch unit receives instructions from two sources and selects between them. The first source is normal instructions 146 fetched from the instruction cache 106 and provided by the fetch unit 104. The second source is normal instructions 148 provided by a microcode unit 128 of the microprocessor 100. The microcode unit 128 includes microcode routines that, for example, implement complex instructions and handle certain exception conditions. Embodiments are contemplated in which the microcode unit 128 is not present in the microprocessor 100.

The microprocessor 100 includes a RAT 134 that determines operand dependencies of normal instructions 146 and 148. The RAT 134 transfers normal instructions 146 and 148 to an instruction scheduler 136 of the microprocessor 100 after determining the operand dependencies. In one embodiment, the microprocessor 100 also includes a reorder buffer (ROB), which is included within the retire unit 144 in one embodiment, that saves state information about each unretired instruction in the microprocessor 100. The ROB insures that normal instructions are retired in program order even though they may be executed out of program order. The RAT 134 allocates an entry in the ROB 118 for each instruction before dispatching the instruction to a reservation station (discussed below). The instruction scheduler 136 schedules normal instructions 146 and 148 for issuance to the execution units 138 for execution thereby. In one embodiment, the microprocessor 100 includes reservation stations (not shown) that are instruction queues that store instructions waiting for their operands so they can be issued to the execution units 138 by the instruction scheduler 136, which are well known in the art of out-of-order execution microprocessors. In one embodiment, the microprocessor 100 performs out-of-order instruction execution, and the instruction scheduler 136 uses the dependency information generated by the RAT 134 to schedule proper instruction execution.

NCB instructions specify a branch condition based on a normal branch condition state (NBCS) 142. The NBCS 142 may be updated with the result of a normal instruction that is fetched prior to the NCB instruction. Therefore, the instruction scheduler 136 waits to issue the NCB instruction to the execution units 138 until the older instruction that updates the NBCS 142 has generated its result and made the result available to the execution units 138. The NBCS 142 may include architecturally visible registers of the microprocessor 100, such as general purpose registers and/or condition code registers, such as the x86 EFLAGS register, for example.

The execution units 138 of the microprocessor 100 execute all normal instructions 146 and 148, including NCB instructions. The execution units 138 execute the NCB instructions using the NBCS 142. If the NBCS 142 satisfies the branch condition specified in the NCB instruction, then the branch is taken and the branch target address specified by the NCB instruction is used to fetch instructions. If the NBCS 142 does not satisfy the branch condition specified in the NCB instruction, then the branch is not taken and the fetch unit 104 or microcode unit 128 fetches instructions from the next sequential address after the address of the NCB instruction in the instruction cache 106 or microcode ROM 506 (of FIG. 5) of the microcode unit 128, respectively.

The execution units 138 transfer results of all executed normal instructions, including NCB instructions, to the retire unit 144. The retire unit 144 keeps track of instructions issued to the execution units 138 and their execution state, writes back results of executed instructions, and retires instructions in program order. Specifically, the retire unit 144 writes the result 174 of an instruction that updates the NBCS 142. The retire unit 144 retires the NCB instruction after the instruction that updates the NBCS 142 has written the result 174 to the NBCS 142. The retire unit 144 generates an indication 178 to the fetch address control 126 in the fetch unit 104 to indicate whether the branch predictor 118 mispredicted the NCB instruction.

If an NCB instruction is mispredicted, the microprocessor 100 flushes from the pipeline all instructions newer in program order than the NCB instruction; the retire unit 144 retires the NCB instruction; the fetch address control 126 generates the mux select 152 to select the NCB correct target address 176 provided by the retire unit 144, which was previously resolved by the execution units 138, which gets selected by the mux 114 for loading into the instruction pointer 112; and the fetch unit 104 fetches the next instruction from the instruction cache 106 at the instruction pointer fetch address 168. Thus, the microprocessor may incur a branch misprediction penalty related to the processing of NCB instructions, but not with respect to FCB instructions.

Table 1 below illustrates a code snippet from a program that includes a FCB and FBCSUI that is helpful in describing operation of the microprocessor 100 of FIG. 1.

TABLE 1

(1) FBCSUI
(2) instr1
(3) instr2
(4) ... (other instructions)
(5) instrN
(6) FCB The instructions of the program of Table 1 are numbered in program order. The first line of the program snippet includes a FBCSUI. The last line of the program snippet includes a FCB instruction. Lines 2 through 5 include other instructions denoted instr1, instr2, through instrN. The programmer attempts to include a number of instructions between the FBCSUI and the FCB such that the fetch unit 104 fetches the FCB just as the retire unit 144 has updated the FBCS 124 and cleared the FBCSUI_pending flag 192. In one embodiment, the number of intervening instructions approximates the number of pipeline stages between the fetch unit 104 and the retire unit 144. In one embodiment, the number of pipeline stages between the fetch unit 104 and the retire unit 144 is on the order of ten. Thus, in those cases where the programmer schedules the FCB appropriately behind the FBCSUI, the fetch unit 104 may be able to non-selectively correctly execute and retire the FCB a significant number of clock cycles earlier than an NCB would be executed by the execution units 138 and retired by the retire unit 144. Furthermore, in those cases where the branch predictor 118 would have mispredicted an NCB, an even greater number of clock cycles may be saved by an appropriately-schedule FCB used by the programmer in the program rather than the mispredicted NCB.

Figure 2:
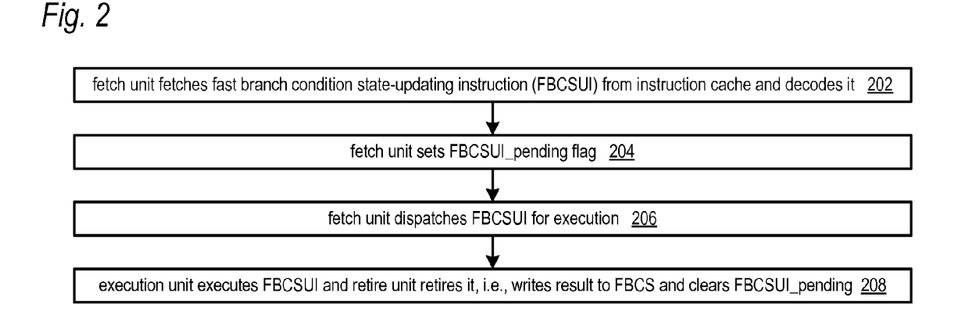
FIG. 2 is a flowchart illustrating operation of the microprocessor of FIG. 1 of the present invention to execute a FBCSUI.

Referring now to FIG. 2, a flowchart illustrating operation of the microprocessor 100 of FIG. 1 of the present invention to execute a FBCSUI is shown. Flow begins at block 202.

At block 202, the fetch unit 104 fetches an instruction from the instruction cache 106, decodes it, and determines that it is a FBCSUI, such as the FBCSUI of line (1) of Table 1 above. Flow proceeds to block 204.

At block 204, the fetch unit 104 asserts the FBCSUI detected indicator 158, which sets the FBCSUI_pending flag 192. Flow proceeds to block 206.

At block 206, the fetch unit 104 dispatches the FBCSUI to the execution pipeline (i.e., to the mux 132, RAT 134, scheduler 136, execution units 138, and retire unit 144) for execution. Flow proceeds to block 208.

At block 208, the execution units 138 execute the FBCSUI and the retire unit 144 retires it. That is, the retire unit 144 writes the FBCSUI result 186 to the FBCS 124 and asserts the FBCSUI resolved indicator 182 to clear the FBCSUI_pending flag 192. It is noted that the actions at block 208 may or may not occur before the fetch unit 104 fetches and decodes the FCB of line (6) of Table 1 at block 302 of FIG. 3 described below depending upon the number and mix of intervening instructions such as those shown in lines (2) through (5) of Table 1 above and the configuration and state of the microprocessor 100 pipeline. Flow ends at block 208.

Figure 3:
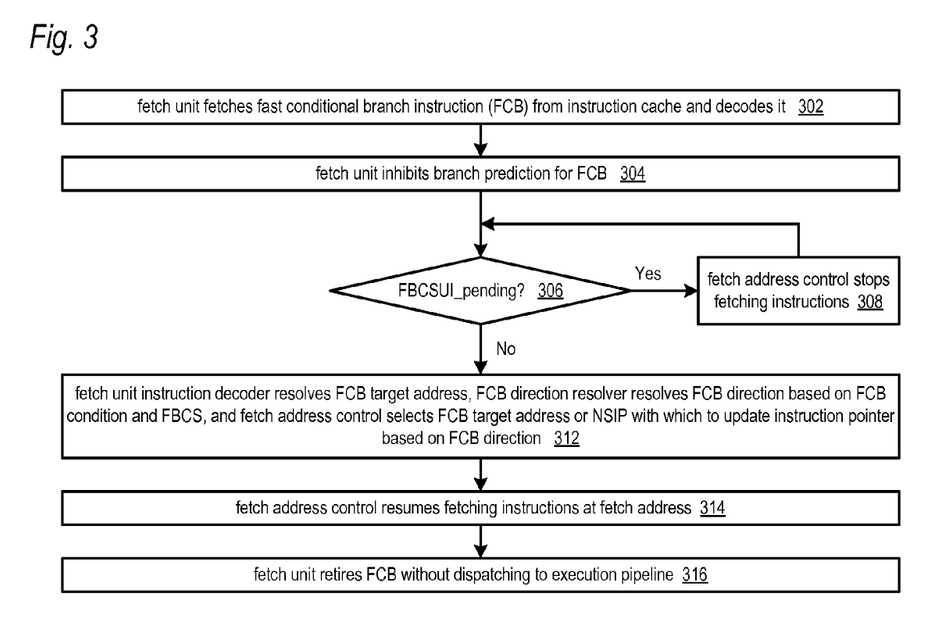
FIG. 3 is a flowchart illustrating operation of the microprocessor of FIG. 1 of the present invention to execute a FCB instruction.

Referring now to FIG. 3, a flowchart illustrating operation of the microprocessor 100 of FIG. 1 of the present invention to execute a FCB instruction is shown. Flow begins at block 302.

At block 302, the fetch unit 104 fetches an instruction from the instruction cache 106, decodes it, and determines that it is a FCB, such as the FCB of line (6) of Table 1 above. Flow proceeds to block 304.

At block 304, the fetch unit 104 inhibits branch prediction by the branch predictor 118 in response to the instruction decoder 108 decoding a FCB. Flow proceeds to decision block 306.

At decision block 306, the fetch address control 126 examines the FBCSUI_pending flag 192 and determines whether a FBCSUI is pending. If so, flow proceeds to block 308; otherwise, flow proceeds to block 312.

At block 308, the fetch address control 126 stops fetching instructions from the instruction cache 106 until the FBCSUI is resolved; thus, flow returns to decision block 306.

At block 312, the fetch unit 104 instruction decoder 108 resolves the FCB target address 162, the FCB direction resolver 122 resolves the FCB direction 172 based on the FCB condition 166 and the FBCS 124, and the fetch address control 126 controls the mux 114 to select the FCB target address 162 if the FCB direction 172 indicates taken or the NSIP 154 if the FCB direction 172 is not taken for loading into the instruction pointer 112. Flow proceeds to block 314.

At block 314, the fetch address control 126 resumes fetching instructions from the instruction cache 106 at the fetch address 168 provided by the instruction pointer 112. Flow proceeds to block 316.

At block 316, the fetch unit 104 retires the FCB. In particular, the fetch unit 104 does not dispatch the FCB to the execution pipeline to be executed and retired since the fetch unit 104 always, i.e., non-selectively, correctly resolves FCB instructions. Flow ends at block 316.

Figure 4:
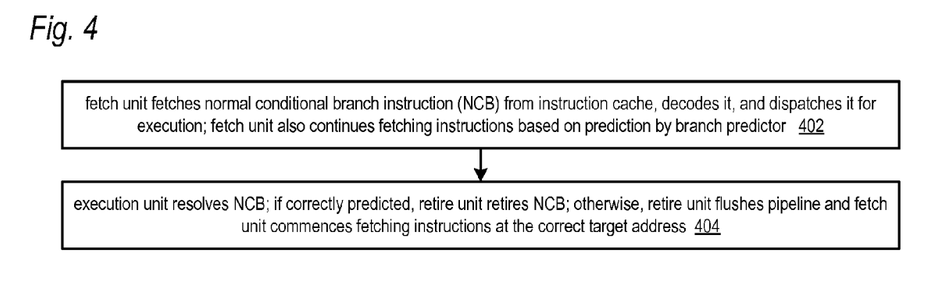
FIG. 4 is a flowchart illustrating operation of the microprocessor of FIG. 1 of the present invention to execute a NCB instruction.

Referring now to FIG. 4, a flowchart illustrating operation of the microprocessor 100 of FIG. 1 of the present invention to execute a NCB instruction is shown. FIG. 4 is provided to illustrate the distinction between operation of the microprocessor 100 to execute a FCB instruction and a NCB instruction and the benefit of having both within the instruction set architecture of the microprocessor 100. Flow begins at block 402.

At block 402, the fetch unit 104 fetches an instruction from the instruction cache 106, decodes it, determines that it is a NCB, and dispatches it to the execution pipeline. Additionally, the fetch unit 104 continues fetching instructions based on the predictions of the NCB made by the branch predictor 118. Flow proceeds to block 404.

At block 404, the execution units 138 resolves the NCB and determines whether it was correctly predicted by the branch predictor 118; that is, the execution units 138 compare the predicted direction 158 with the correct direction determined by the execution units 138 and compare the predicted target address 156 with the correct target address generated by the execution units 138 to see if both match. If so, the retire unit 144 retires the NCB. Otherwise, the retire unit 144 flushes the microprocessor 100 pipeline and causes the fetch unit 104 to commence fetching instructions from the instruction cache 106 at the correct target address 176. Flow ends at block 404.

As discussed, the fetch unit 104 resolves and retires FCB instructions without dispatching them to the execution pipeline. This is advantageous for other reasons besides those discussed above such as potentially faster aggregate execution time due to the elimination of mispredictions and corrections that are associated with conventional conditional branch instructions when a FCB instruction may be used by the programmer rather than a conventional conditional branch instruction. Another advantage is that fewer resources of the microprocessor 100 are used to resolve and retire the FCB than a conventional conditional branch instruction. For example, because the FCB is not dispatched to the execution pipeline, the FCB does not occupy entries in the RAT 134, reservation station, execution units 138, or reorder buffer (ROB).

Figure 5:
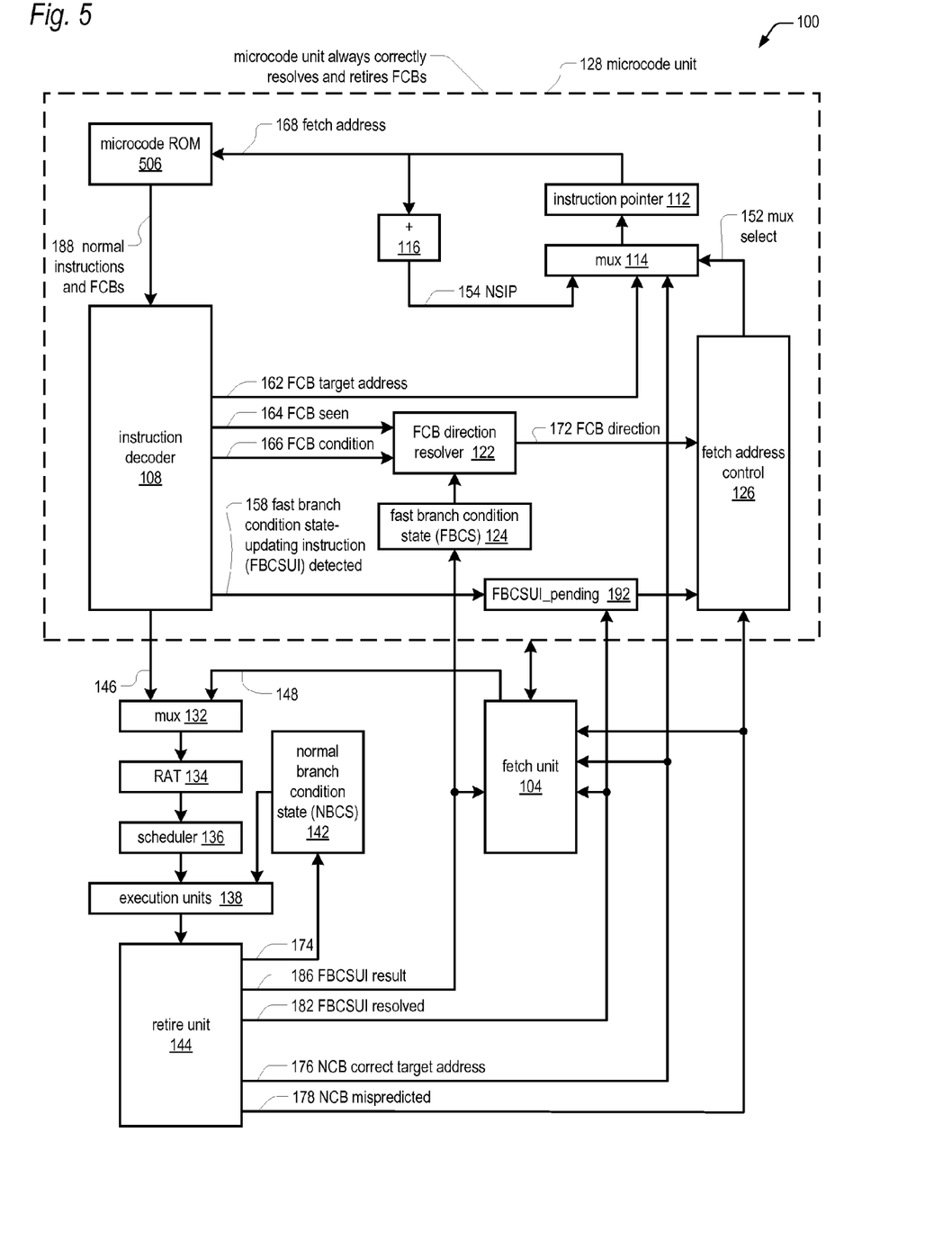
FIG. 5 is a block diagram illustrating a microprocessor according to an alternate embodiment of the present invention.

Referring now to FIG. 5, a block diagram illustrating a microprocessor 100 according to an alternate embodiment of the present invention is shown. FIG. 5 is similar to FIG. 1 in many respects. However, details of the details of the fetch unit 104 are not shown in FIG. 5 and the details of the microcode unit 128 are shown. The microcode unit 128 of FIG. 5 includes many elements similar to the fetch unit 104 of FIG. 1 and like-numbered elements perform similar functions.

One difference is that the microcode unit 128 fetches instructions 188 from a microcode ROM 506, rather than from the instruction cache 106 of FIG. 1. The microcode ROM 506 stores microcode routine instructions that perform actions needed by the microprocessor 100 in order to process the instructions of user programs. Thus, in this sense, the microcode routines stored in the microcode ROM 506 are non-user programs because they are not part of the user programs themselves. In other words, the designers of the microprocessor 100 develop the microcode routines stored in the microcode ROM 506 rather than normal users of the microprocessor 100 that write user programs that are stored in system memory and/or a non-volatile storage medium of the computer system, such as a disk drive.

An example of actions performed by the microcode routines is exception handling. The microcode ROM 506 includes exception handlers that are used to handle exceptions generated by user program instructions, such as invalid opcode exceptions, divide by zero exceptions, interrupts, and page faults, which are given as illustrative examples, as well as micro-exceptions taken by the microprocessor 100 that are specific to the microarchitecture of the microprocessor 100 rather than exceptions defined by the macroarchitecture of the microprocessor 100. For another example, the microcode routines include code that implements complex and infrequently executed instructions of the microprocessor 100 instruction set, such as trigonometric function instructions, read/write model specific registers instructions, and serializing instructions (such as the serializing instructions defined by the x86 architecture in section 7.4 of the IA-32 Intel® Architecture Software Developer's Manual, Volume 3A: System Programming Guide, Part 1, June 2006, which is hereby incorporated by reference in its entirety for all purposes) that may update control values that put the microprocessor 100 in a new mode or state such as changing the paging mode or put the microprocessor 100 in protected mode or updating descriptor tables or invalidating cache lines, which are given as illustrative examples. Thus, the microcode unit 128 is a second fetch unit of the microprocessor 100 that fetches microcode routine instructions from the microcode ROM 506, decodes them, and in the case of an FCB instruction, also always correctly resolves and retires FCB instructions.

Another difference is the microcode unit 128 does not include the branch predictor 118 of FIG. 1. Consequently, in normal flow (i.e., in the absence of an FCB, correction for mispredicted NCB, exception, trap to microcode to implement a user instruction, etc.), the microcode unit 128 always "predicts" that a conditional branch instruction will not be taken, i.e., the microcode unit 128 fetches the instruction at the NSIP 154 rather than at a predicted target address such as provided by the branch predictor 118 of FIG. 1. However, embodiments are contemplated in which the microcode unit 128 includes a branch predictor, albeit perhaps smaller, less complex, and less power-consuming, that performs a function similar to the branch predictor 118 of FIG. 1.

Nevertheless, like the fetch unit 104 of FIG. 1, the microcode unit 128 of FIG. 5 is configured to fetch and unconditionally correctly resolve and retire FCBs, as will be described now with respect to FIGS. 6 through 8. It is noted that an embodiment is contemplated in which both the fetch unit 104 and the microcode unit 128 are configured to fetch and unconditionally correctly resolve and retire FCBs; whereas, embodiments are also contemplated in which only one of the fetch unit 104 and the microcode unit 128 are configured to fetch and unconditionally correctly resolve and retire FCBs.

Figure 6:
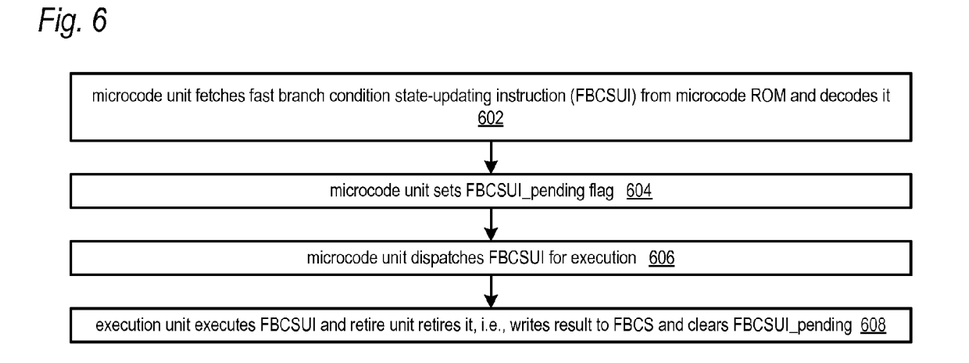
FIG. 6 is a flowchart illustrating operation of the microprocessor of FIG. 5 of the present invention to execute a FBCSUI.
Figure 7:
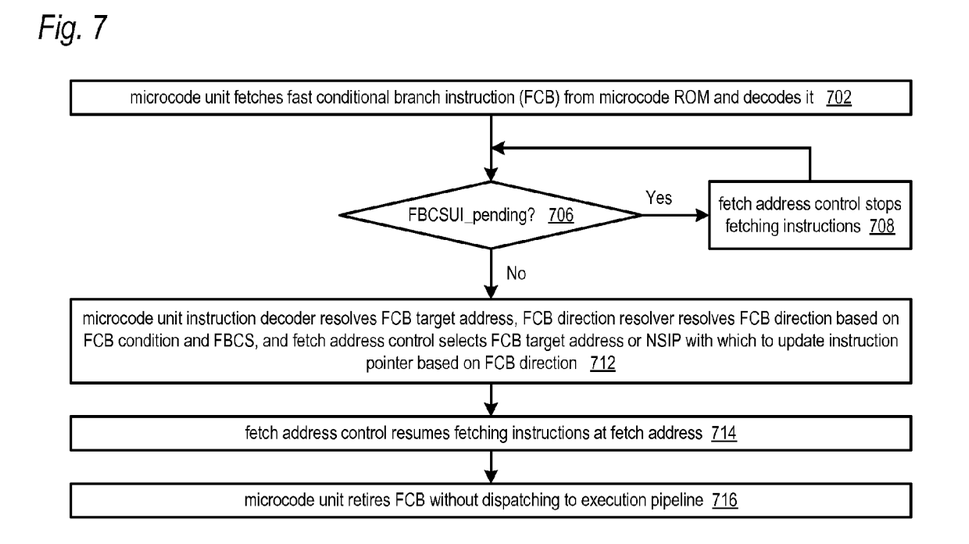
FIG. 7 is a flowchart illustrating operation of the microprocessor of FIG. 5 of the present invention.
Figure 8:
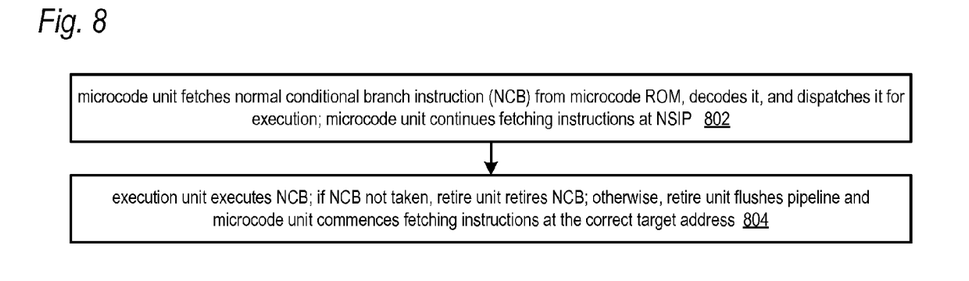
FIG. 8 is a flowchart illustrating operation of the microprocessor of FIG. 5 of the present invention to execute a NCB instruction.

Many of the steps performed in the flowcharts of FIGS. 6 through 8 are similar to the steps performed in the flowcharts of FIGS. 2 through 4. However, steps which are performed by elements of the fetch unit 104 in FIGS. 2 through 4 are performed by corresponding elements of the microcode unit 128 in FIGS. 6 through 8. Furthermore, as mentioned above, the microcode unit 128 does not perform branch prediction; thus, FIGS. 7 and 8 do not include steps associated with branch prediction.

Referring now to FIG. 6, a flowchart illustrating operation of the microprocessor 100 of FIG. 5 of the present invention to execute a FBCSUI is shown. Flow begins at block 602.

At block 602, the microcode unit 128 fetches an instruction from the microcode ROM 506, decodes it, and determines that it is a FBCSUI, such as the FBCSUI of line (1) of Table 1 above. Flow proceeds to block 604.

At block 604, the microcode unit 128 asserts the FBCSUI detected indicator 158, which sets the FBCSUI_pending flag 192. Flow proceeds to block 606.

At block 606, the microcode unit 128 dispatches the FBCSUI to the execution pipeline (i.e., to the mux 132, RAT 134, scheduler 136, execution units 138, and retire unit 144) for execution. Flow proceeds to block 608.

At block 608, the execution units 138 execute the FBCSUI and the retire unit 144 retires it. That is, the retire unit 144 writes the FBCSUI result 186 to the FBCS 124 and asserts the FBCSUI resolved indicator 182 to clear the FBCSUI_pending flag 192. It is noted that the actions at block 608 may or may not occur before the microcode unit 128 fetches and decodes the FCB of line (6) of Table 1 at block 702 of FIG. 7 described below depending upon the number and mix of intervening instructions such as those shown in lines (2) through (5) of Table 1 above and the configuration and state of the microprocessor 100 pipeline. Flow ends at block 608.

Referring now to FIG. 7, a flowchart illustrating operation of the microprocessor 100 of FIG. 5 of the present invention to execute a FCB instruction is shown. Flow begins at block 702.

At block 702, the microcode unit 128 fetches an instruction from the microcode ROM 506, decodes it, and determines that it is a FCB, such as the FCB of line (6) of Table 1 above. Flow proceeds to decision block 706.

At decision block 706, the fetch address control 126 examines the FBCSUI_pending flag 192 and determines whether a FBCSUI is pending. If so, flow proceeds to block 708; otherwise, flow proceeds to block 712.

At block 708, the fetch address control 126 stops fetching instructions from the microcode ROM 506 until the FBCSUI is resolved; thus, flow returns to decision block 706.

At block 712, the microcode unit 128 instruction decoder 108 resolves the FCB target address 162, the FCB direction resolver 122 resolves the FCB direction 172 based on the FCB condition 166 and the FBCS 124, and the fetch address control 126 controls the mux 114 to select the FCB target address 162 if the FCB direction 172 indicates taken or the NSIP 154 if the FCB direction 172 is not taken for loading into the instruction pointer 112. Flow proceeds to block 714.

At block 714, the fetch address control 126 resumes fetching instructions from the microcode ROM 506 at the fetch address 168 provided by the instruction pointer 112. Flow proceeds to block 716.

At block 716, the microcode unit 128 retires the FCB. In particular, the microcode unit 128 does not dispatch the FCB to the execution pipeline to be executed and retired since the microcode unit 128 always, i.e., non-selectively, correctly resolves FCB instructions. Flow ends at block 716.

Referring now to FIG. 8, a flowchart illustrating operation of the microprocessor 100 of FIG. 5 of the present invention to execute a NCB instruction is shown. FIG. 8 is provided to illustrate the distinction between operation of the microprocessor 100 to execute a FCB instruction and a NCB instruction and the benefit of having both within the instruction set architecture of the microprocessor 100. Flow begins at block 802.

At block 802, the microcode unit 128 fetches an instruction from the microcode ROM 506, decodes it, determines that it is a NCB, and dispatches it to the execution pipeline. Additionally, the microcode unit 128 continues fetching instructions at the NSIP 154. Flow proceeds to block 804.

At block 804, the execution units 138 resolves the NCB and determines whether the correct direction of the NCB was not taken. If so, the retire unit 144 retires the NCB. Otherwise, the retire unit 144 flushes the microprocessor 100 pipeline and causes the microcode unit 128 to commence fetching instructions from the microcode ROM 506 at the correct target address 176 to correct for the sequential instruction fetching by the microcode unit 128 at block 802. Flow ends at block 804.

Although embodiments have been described in which the FCB includes an implicit wait semantic that causes the fetch unit or microcode unit to wait to resolve the FCB until the FBCSUI_pending flag is clear, other embodiments are contemplated in which the programmer includes in the program between the state-updating instruction and the FCB an explicit wait instruction that performs the wait function. Thus, in the snippet of Table 1 above, the explicit wait instruction would be inserted between the instructions at lines (5) and (6). When the instruction decoder decodes the wait instruction, it performs an action similar to that described with respect to blocks 306 and 308 of FIG. 3 (or blocks 706 and 708 of FIG. 7). Accordingly, in this embodiment, when the instruction decoder 108 decodes a FCB, flow proceeds directly from block 304 to block 312 of FIG. 3 (or directly from block 702 to block 712 of FIG. 7).

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
    a register, configured to store a state;
    a fetch unit, coupled to said register, configured to fetch instructions of a program, the program including a first instruction followed non-immediately by a second instruction, wherein the first instruction instructs the microprocessor to update the state in the register, wherein the second instruction is a conditional branch instruction that specifies a branch condition based on the state in the register, wherein the fetch unit is configured to dispatch the first instruction for execution but to refrain from dispatching the second instruction for execution; and execution units, configured to receive the first instruction from the fetch unit and responsively update the state in the register;

wherein the fetch unit is configured to non-selectively correctly resolve the conditional branch instruction based on the state in the register when the execution units have updated the state in the register, and configured to non-selectively refrain from sending the conditional branch instruction to the execution units to be resolved regardless of whether the execution units have updated the state in the register.

2. The microprocessor of claim 1, wherein the conditional branch instruction is of a first type within an instruction set of the microprocessor, wherein the instruction set also includes a second type of conditional branch instruction that specifies a branch condition based on state in the processor other than the state in the register, wherein the fetch unit is configured to send the second type of conditional branch instruction to the execution units to be resolved.

3. The microprocessor of claim 1, further comprising:
issue logic, coupled between the fetch unit and the execution units, configured to receive instructions other than the conditional branch instruction from the fetch unit and to issue the instructions to the execution units for execution thereby, the issue logic further configured to wait to issue each of the instructions other than the conditional branch instruction to the execution units until dependencies of the instruction have been resolved;
wherein the fetch unit is configured to non-selectively refrain from sending the conditional branch instruction to the issue logic.

4. The microprocessor of claim 1, further comprising:
issue logic, coupled to said execution units, configured to issue instructions other than the conditional branch instruction to the execution units for execution thereby, wherein said issue logic comprises a predetermined maximum number of issue slots per clock cycle for issuing the instructions other than the conditional branch instruction to the execution units;
wherein the microprocessor is spared from consuming any of the predetermined maximum number of issue slots per clock cycle for issuing the conditional branch instruction to the execution units because the fetch unit non-selectively correctly resolves the conditional branch instruction.

5. The microprocessor of claim 1, wherein the execution units are configured to execute instructions of the program other than the conditional branch instruction out of order, the microprocessor further comprising:
a buffer, coupled to said execution units, configured to store state associated with instructions other than the conditional branch instruction issued to the execution units to insure in-order retirement thereof;
wherein the microprocessor refrains from storing any state in the buffer for the conditional branch instruction because the fetch unit non-selectively correctly resolves the conditional branch instruction.

6. The microprocessor of claim 1, further comprising:
a table, coupled to said execution units, configured to store operand dependency information associated with instructions other than the conditional branch instruction issued to the execution units to insure correct execution order thereof;
wherein the microprocessor refrains from storing any operand dependency information in the table for the conditional branch instruction because the fetch unit non-selectively correctly resolves the conditional branch instruction.

7. The microprocessor of claim 1, further comprising:
one or more instruction queues, coupled to said execution units, configured to store instructions other than the conditional branch instruction waiting to be issued to the execution units for execution thereby;
wherein the microprocessor refrains from storing the conditional branch instruction in the one or more instruction queues because the fetch unit non-selectively correctly resolves the conditional branch instruction.

8. The microprocessor of claim 1, further comprising:
a memory, configured to store program instructions that the fetch unit fetches, wherein the program is a non-user program, wherein the non-user program is configured to implement an instruction of a user program, wherein the user program instruction is included in a user-visible instruction set of the microprocessor; and
a second fetch unit, configured to fetch instructions of the user program that includes the instruction that the non-user program implements.

9. The microprocessor of claim 8, further comprising:
an instruction decoder, coupled to the second fetch unit, configured to decode the user program instruction and to responsively cause the first fetch unit to fetch the non-user program to implement the user program instruction.

10. The microprocessor of claim 1, wherein the microprocessor allows non-user programs to modify the state in the register and does not allow user programs to modify the state in the register.

11. The microprocessor of claim 1, wherein the program includes a third instruction intermediate the first and second instructions, wherein the third instruction instructs the fetch unit to wait to non-selectively correctly resolve the conditional branch instruction based on the state in the register until the execution units indicate that they have updated the state in the register in response to the first instruction.

12. The microprocessor of claim 1, wherein the conditional branch instruction instructs the fetch unit to wait to non-selectively correctly resolve the conditional branch instruction based on the state in the register until the execution units indicate that they have updated the state in the register in response to the first instruction.

13. The microprocessor of claim 1, wherein the fetch unit is further configured to stop fetching instructions until the execution units indicate that they have updated the state in the register in response to the first instruction.

14. A method for performing fast conditional branch instructions in a microprocessor, the method comprising:
fetching a first instruction of a program, wherein the first instruction instructs the microprocessor to update a state in a register, wherein the register is configured to store a state, wherein said fetching the first instruction is performed by a fetch unit of the microprocessor;
dispatching the first instruction from the fetch unit to execution units of the microprocessor;
updating the state in the register, in response to receiving the dispatched first instruction from the fetch unit, wherein said updating is performed by the execution units;
fetching a second instruction of the program, wherein the second instruction non-immediately follows the first instruction in the program, wherein the second instruction is a conditional branch instruction that specifies a branch condition based on the state in the register, wherein said fetching the second instruction is performed by the fetch unit;

refraining from dispatching the second instruction for execution;

non-selectively correctly resolving the conditional branch instruction by the fetch unit based on the state in the register when the execution units have updated the state in the register; and non-selectively refraining from sending the conditional branch instruction to the execution units to be resolved regardless of whether the execution units have updated the state in the register.

15. The method as recited in claim 14, wherein the conditional branch instruction is of a first type within an instruction set of the microprocessor, wherein the instruction set also includes a second type of conditional branch instruction that specifies a branch condition based on state in the processor other than the state in the register, the method further comprising:

sending the second type of conditional branch instruction to the execution units to be resolved.

16. The method as recited in claim 14, wherein the microprocessor also includes issue logic coupled between the fetch unit and the execution units, the method further comprising:

receiving instructions other than the conditional branch instruction from the fetch unit, wherein said receiving instructions is performed by the issue logic;

issuing the instructions other than the conditional branch instruction to the execution units for execution thereby, wherein said issuing the instructions is performed by the issue logic;

waiting to issue each of the instructions other than the conditional branch instruction to the execution units until dependencies of the instruction have been resolved, wherein said waiting is performed by the issue logic;

non-selectively refraining from sending the conditional branch instruction to the issue logic.

17. The method as recited in claim 14, further comprising:

issuing instructions other than the conditional branch instruction to the execution units for execution thereby, wherein said issue logic comprises a predetermined maximum number of issue slots per clock cycle for issuing the instructions other than the conditional branch instruction to the execution units, wherein said issuing the instructions is performed by the issue logic;

wherein the microprocessor is spared from consuming any of the predetermined maximum number of issue slots per clock cycle for issuing the conditional branch instruction to the execution units because the fetch unit non-selectively correctly resolves the conditional branch instruction.

18. The method as recited in claim 14, wherein the execution units are configured to execute instructions other than the conditional branch instruction of the program out of order, the method further comprising:

storing in a buffer state associated with instructions other than the conditional branch instruction issued to the execution units to insure in-order retirement thereof;

wherein the microprocessor refrains from storing any state in the buffer for the conditional branch instruction because the fetch unit non-selectively correctly resolves the conditional branch instruction.

19. The method as recited in claim 14, further comprising:

storing in a table operand dependency information associated with instructions other than the conditional branch instruction issued to the execution units to insure correct execution order thereof;

wherein the microprocessor refrains from storing any operand dependency information in the table for the conditional branch instruction because the fetch unit non-selectively correctly resolves the conditional branch instruction.

20. The method as recited in claim 14, further comprising:

storing in one or more instruction queues instructions other than the conditional branch instruction waiting to be issued to the execution units for execution thereby;

wherein the microprocessor refrains from storing the conditional branch instruction in the one or more instruction queues because the fetch unit non-selectively correctly resolves the conditional branch instruction.

21. The method as recited in claim 14, wherein the microprocessor further includes a second fetch unit, the method further comprising:

storing in a memory program instructions that the fetch unit fetches, wherein the program is a non-user program, wherein the non-user program is configured to implement an instruction of a user program, wherein the user program instruction is included in a user-visible instruction set of the microprocessor; and fetching instructions of the user program that includes the instruction that the non-user program implements, wherein said fetching instructions of the user program is performed by the second fetch unit.

22. The method as recited in claim 21, further comprising:

decoding the user program instruction; and responsively causing the first fetch unit to fetch the non-user program to implement the user program instruction;

wherein said decoding the user program and said responsively causing the first fetch unit to fetch the non-user program are performed by an instruction decoder of the microprocessor.

23. The method as recited in claim 14, wherein the microprocessor allows non-user programs to modify the state in the register and does not allow user programs to modify the state in the register.

24. The method as recited in claim 14, further comprising:

fetching a third instruction of the program, between said fetching the first instruction and said fetching the second instruction, wherein the third instruction instructs the fetch unit to wait to non-selectively correctly resolve the conditional branch instruction based on the state in the register until the execution units indicate that they have updated the state in the register in response to the first instruction.

25. The method as recited in claim 14, wherein the conditional branch instruction instructs the fetch unit to wait to non-selectively correctly resolve the conditional branch instruction based on the state in the register until the execution units indicate that they have updated the state in the register in response to the first instruction.

26. The method of claim 25, wherein the fetch unit stops fetching instructions until the execution units indicate that they have updated the state in the register in response to the first instruction.

27. A computer program product for use with a computing device, the computer program product comprising:

a computer usable storage medium, having computer readable program code embodied in said medium, for specifying a microprocessor configured to perform fast conditional branch instructions, the computer readable program code comprising:

first program code for specifying a register, configured to store a state;

second program code for specifying a fetch unit, coupled to said register, configured to fetch instructions of a program, the program including a first instruction followed non-immediately by a second instruction, wherein the first instruction instructs the microprocessor to update the state in the register, wherein the second instruction is a conditional branch instruction that specifies a branch condition based on the state in the register, wherein the fetch unit is configured to dispatch the first instruction for execution but to refrain from dispatching the second instruction for execution; and third program code for specifying execution units, configured to receive the first instruction from the fetch unit and responsively update the state in the register;

wherein the fetch unit is configured to non-selectively correctly resolve the conditional branch instruction based on the state in the register when the execution units have updated the state in the register, and configured to non-selectively refrain from sending the conditional branch instruction to the execution units to be resolved regardless of whether the execution units have updated the state in the register.

* * * * *